United States Patent
Xu et al.

(10) Patent No.: US 9,232,540 B2
(45) Date of Patent: Jan. 5, 2016

(54) RANDOM ACCESS CHANNEL DESIGN FOR NARROW BANDWIDTH OPERATION IN A WIDE BANDWIDTH SYSTEM

(71) Applicants: Hao Xu, San Diego, CA (US); Juan Montojo, Nuremburg (DE); Peter Gaal, San Diego, CA (US); Wanshi Chen, San Diego, CA (US); Jelena M. Damnjanovic, San Diego, CA (US)

(72) Inventors: Hao Xu, San Diego, CA (US); Juan Montojo, Nuremburg (DE); Peter Gaal, San Diego, CA (US); Wanshi Chen, San Diego, CA (US); Jelena M. Damnjanovic, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 559 days.

(21) Appl. No.: 13/629,134

(22) Filed: Sep. 27, 2012

(65) Prior Publication Data

US 2013/0083749 A1    Apr. 4, 2013

Related U.S. Application Data

(60) Provisional application No. 61/542,000, filed on Sep. 30, 2011.

(51) Int. Cl.
     *H04W 74/08*      (2009.01)
     *H04W 74/00*      (2009.01)
     *H04L 1/18*      (2006.01)
     *H04L 5/00*      (2006.01)

(52) U.S. Cl.
CPC ......... *H04W 74/0833* (2013.01); *H04L 1/1854* (2013.01); *H04L 1/1861* (2013.01); *H04L 1/1896* (2013.01); *H04L 5/0053* (2013.01); *H04W 74/004* (2013.01); *H04W 74/006* (2013.01); *H04W 74/008* (2013.01)

(58) Field of Classification Search
None
See application file for complete search history.

(56) References Cited

U.S. PATENT DOCUMENTS

| | | | |
|---|---|---|---|
| 7,167,713 B2 | 1/2007 | Anderson | |
| 7,170,889 B2 | 1/2007 | Eagling et al. | |
| 2009/0010219 A1* | 1/2009 | Lee et al. | 370/329 |
| 2009/0181687 A1 | 7/2009 | Tiirola et al. | |

(Continued)

FOREIGN PATENT DOCUMENTS

| | | |
|---|---|---|
| JP | 2014504835 A | 2/2014 |
| WO | 2012104635 A1 | 8/2012 |

(Continued)

OTHER PUBLICATIONS

3GPP: "3rd Generation Partnership Project; Technical Specification Group Radio Access Network; Study on RAN Improvements for Machine-type Communications; (Release 10)". 3GPP Draft; R2-113685 TR37.868 V0.8.0, 3rd Generation Partnership Project (3GPP), Mobile Competence Centre; 650, Route Des Lucioles ; F-06921 Sophia-Antipolis Cedex ; PCT/US2012/057845 vol. RAN WG2, Jun. 10, 2011, XP050538784, [retrieved on Jun. 10, 2011].

(Continued)

*Primary Examiner* — Ashley Shivers
(74) *Attorney, Agent, or Firm* — Seyfarth Shaw LLP

(57) ABSTRACT

A method of wireless communication includes a random access channel configuration for narrow bandwidth operations within a wider LTE system bandwidth. A first random access channel (RACH) configuration is broadcast for a regular device. A second RACH configuration is broadcast for a narrow bandwidth device. The narrow bandwidth device operates in a narrower bandwidth than the regular device.

26 Claims, 12 Drawing Sheets

(56) References Cited

U.S. PATENT DOCUMENTS

| | | | |
|---|---|---|---|
| 2009/0257421 A1 | 10/2009 | Nakashima et al. | |
| 2011/0085457 A1 | 4/2011 | Chen et al. | |
| 2012/0002613 A1 | 1/2012 | Kishiyama et al. | |
| 2012/0327894 A1* | 12/2012 | Axmon et al. | 370/330 |
| 2012/0327895 A1* | 12/2012 | Wallen et al. | 370/330 |
| 2014/0105164 A1* | 4/2014 | Moulsley et al. | 370/329 |
| 2014/0112254 A1* | 4/2014 | Lindoff | H04W 74/002 370/329 |

FOREIGN PATENT DOCUMENTS

| | | |
|---|---|---|
| WO | 2013000818 A1 | 1/2013 |
| WO | 2013049768 A1 | 4/2013 |

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP Standard; 3GPP TS 36.211, 3rd Generation Partnership Project (3GPP), Mobile Competence Centre ; 650, Route Des Lucioles ; F-06921 Sophia-Antipolis Cedex ; France, vol. RAN WG1, No. V10.2.0, Jun. 22, 2011, pp. 1-103, XP050553380, [retrieved on Jun. 22, 2011].

Fujitsu: "On support of low-cost MTC terminals with reduced Tx/Rx bandwidths", 3GPP Draft; R1-112669, 3rd Generation Partnership Project (3GPP), Mobile Competence Centre ; 650, Route Des Lucioles ; F-06921 Sophia-Anti Polis Cedex; France, vol. Ran WG1, no. Athens, Greece; Aug. 22, 2011, Aug. 16, 2011, XP050537715, [retrieved on Aug. 16, 2011], p. 1.

Huawei: "Considerations on Ran overload control", 3GPP Draft; R2-102894 Considerations on RAN Overload Control, 3rd Generation Partnership Project (3GPP), Mobile Competence Centre ; 650, Route Des Lucioles ; F-06921 Sophia-Antipolis Cedex ; France, vol. RAN WG2, no. Montreal, Canada; May 10, 2010, May 3, 2010, XP050423049, [retrieved on May 3, 2010].

International Search Report and Written Opinion—PCT/US2012/057845—ISA/EPO—Jan. 11, 2013.

* cited by examiner

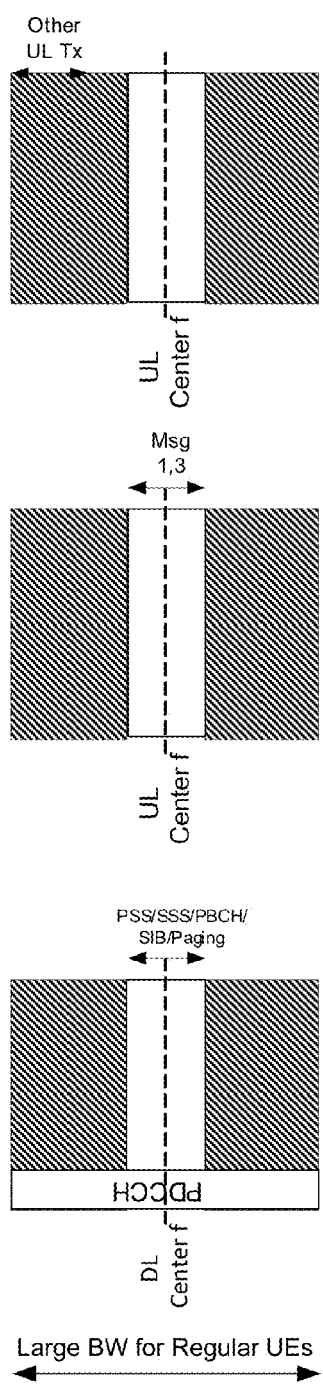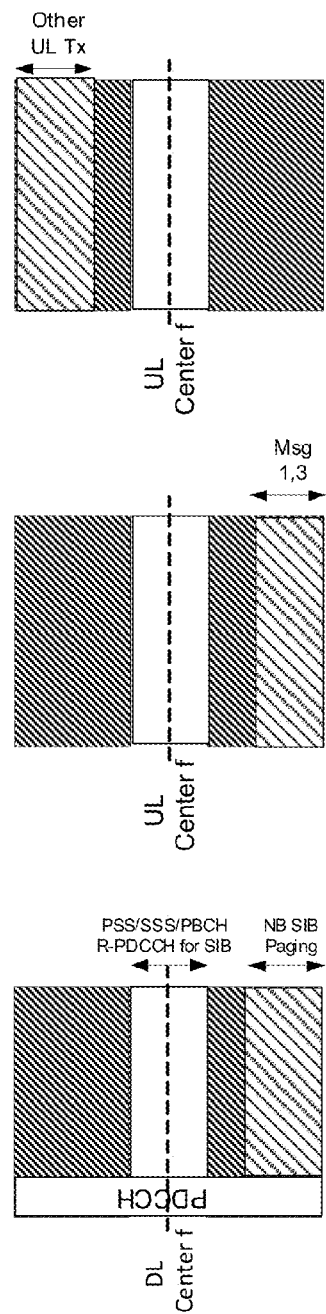

RANDOM ACCESS CHANNEL DESIGN FOR NARROW BANDWIDTH OPERATION IN A WIDE BANDWIDTH SYSTEM

CROSS-REFERENCE TO RELATED APPLICATION

This application claims the benefit under 35 U.S.C. §119(e) to U.S. Provisional Patent Application No. 61/542,000 entitled "Random Access Channel Design for Narrow Bandwidth Operation in a Wide Bandwidth System," filed on Sep. 30, 2011, the disclosure of which is expressly incorporated by reference herein in its entirety.

BACKGROUND

1. Field

Aspects of the present disclosure relate generally to wireless communication systems, and more particularly to the random access channel configurations for narrow bandwidth operation within a wider LTE (long term evolution) system bandwidth.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect, a method of wireless communication is disclosed. The method includes broadcasting a first random access channel (RACH) configuration for a regular device. The method also includes broadcasting a second RACH configuration for the narrow bandwidth device. The narrow bandwidth device operates in a narrower bandwidth than the regular device.

Another aspect discloses a method of wireless communication and includes receiving a random access channel (RACH) configuration in a defined narrow band different from a RACH configuration received by a regular user equipment. The method also includes transmitting in accordance with the received RACH configuration.

In another aspect, a wireless communication is disclosed and includes a memory and at least one processor coupled to the memory. The processor(s) is configured to broadcast a first random access channel (RACH) configuration for a regular device. The processor(s) is also configured to broadcast a second RACH configuration for the narrow bandwidth device. The narrow bandwidth device operates in a narrower bandwidth than the regular device.

Another aspect discloses wireless communication having a memory and at least one processor coupled to the memory. The processor(s) is configured to receive a random access channel (RACH) configuration in a defined narrow band different from a RACH configuration received by a regular user equipment (UE). The processor(s) is also configured to transmit in accordance with the received RACH configuration.

In another aspect, an apparatus is disclosed and includes a means for broadcasting a first random access channel (RACH) configuration for a regular device. The method also includes broadcasting a second RACH configuration for the narrow bandwidth device. The narrow bandwidth device operates in a narrower bandwidth than the regular device.

Another aspect discloses an apparatus including means for receiving a random access channel (RACH) configuration in a defined narrow band different from a RACH configuration received by a regular user equipment. The apparatus also includes a means for transmitting in accordance with the received RACH configuration.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of broadcasting a first random access channel (RACH) configuration for a regular device. The program code also causes the processor(s) to broadcast a second RACH configuration for the narrow bandwidth device. The narrow bandwidth device operates in a narrower bandwidth than the regular device.

Another aspect discloses a computer program product for wireless communications in a wireless network having a non-transitory computer-readable medium. The computer readable medium has non-transitory program code recorded thereon which, when executed by the processor(s), causes the processor(s) to perform operations of receiving a random access channel (RACH) configuration in a defined narrow band different from a RACH configuration received by a regular user equipment. The program code also causes the processor(s) to transmit in accordance with the received RACH configuration.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 7A and 7B are diagrams conceptually illustrating narrow bandwidth operation.

DETAILED DESCRIPTION

Figure 1:
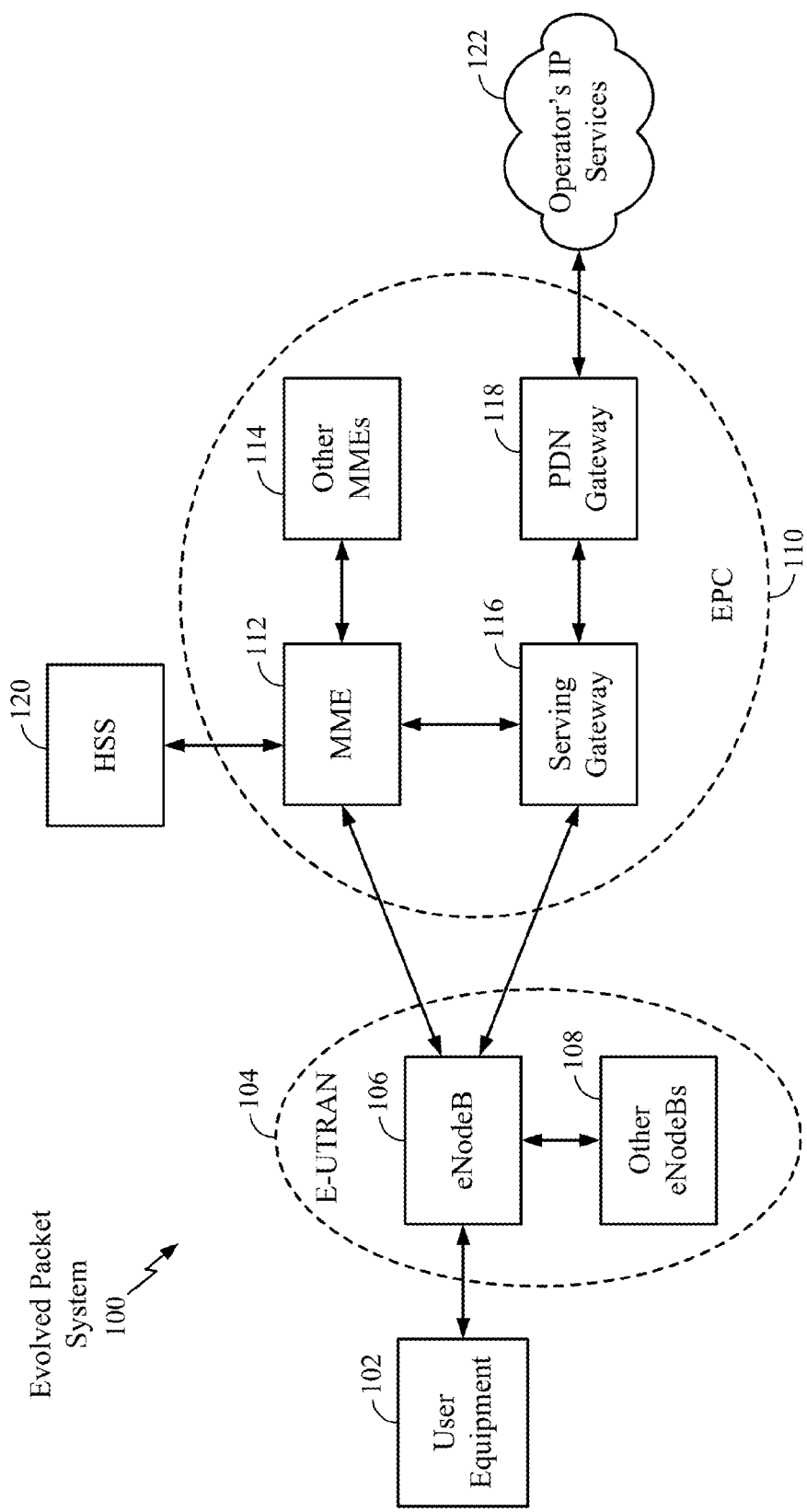
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
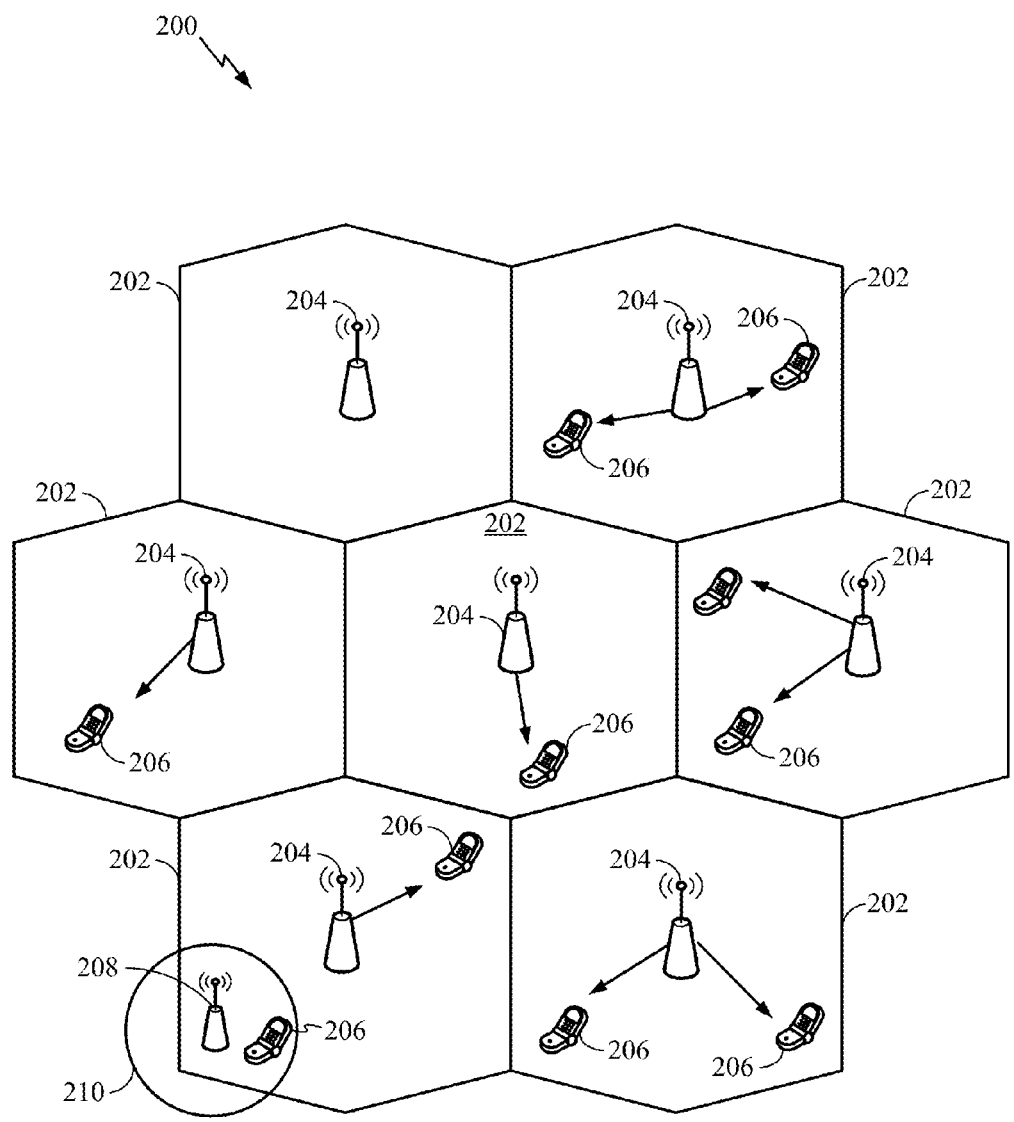
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
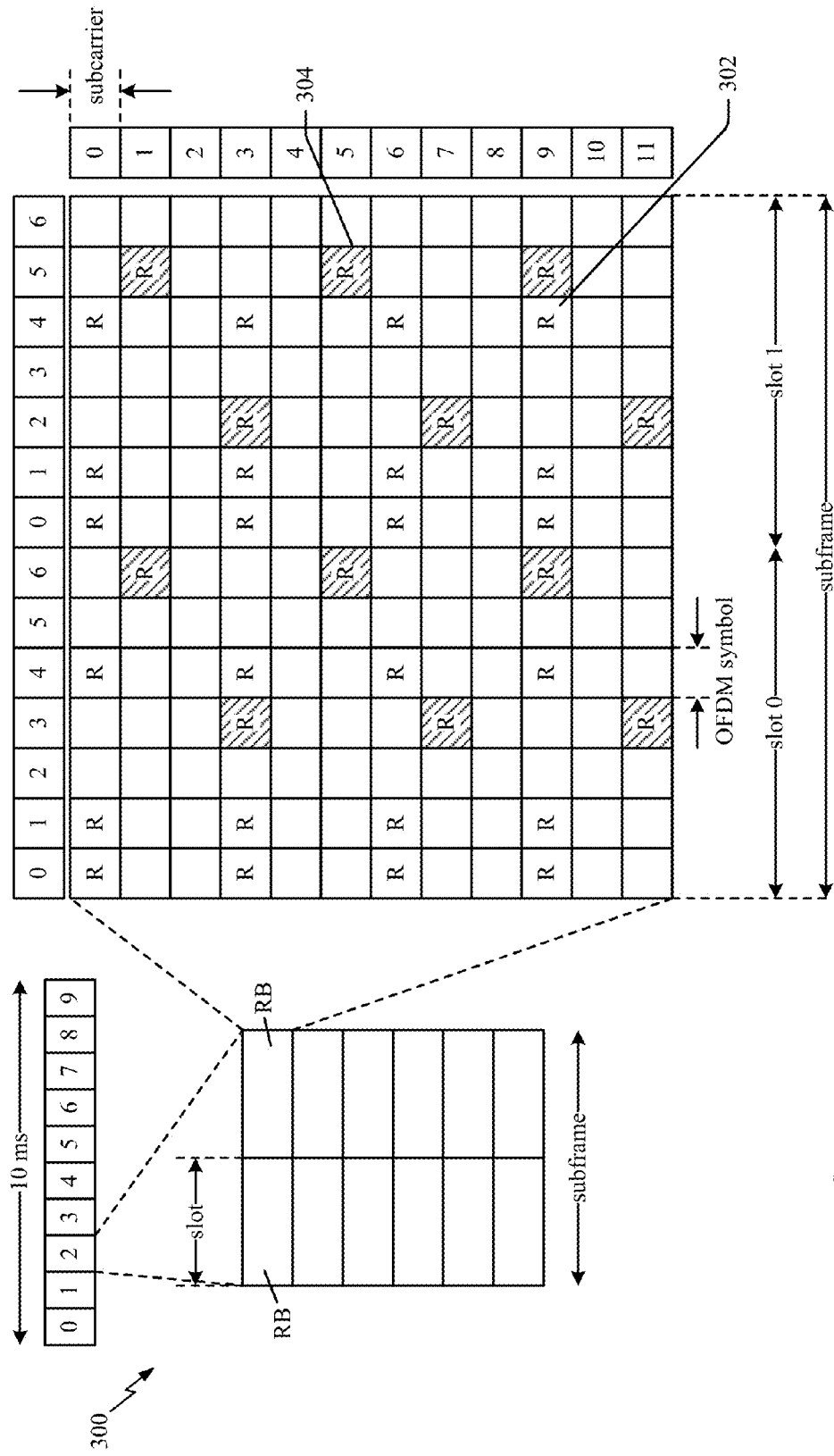
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
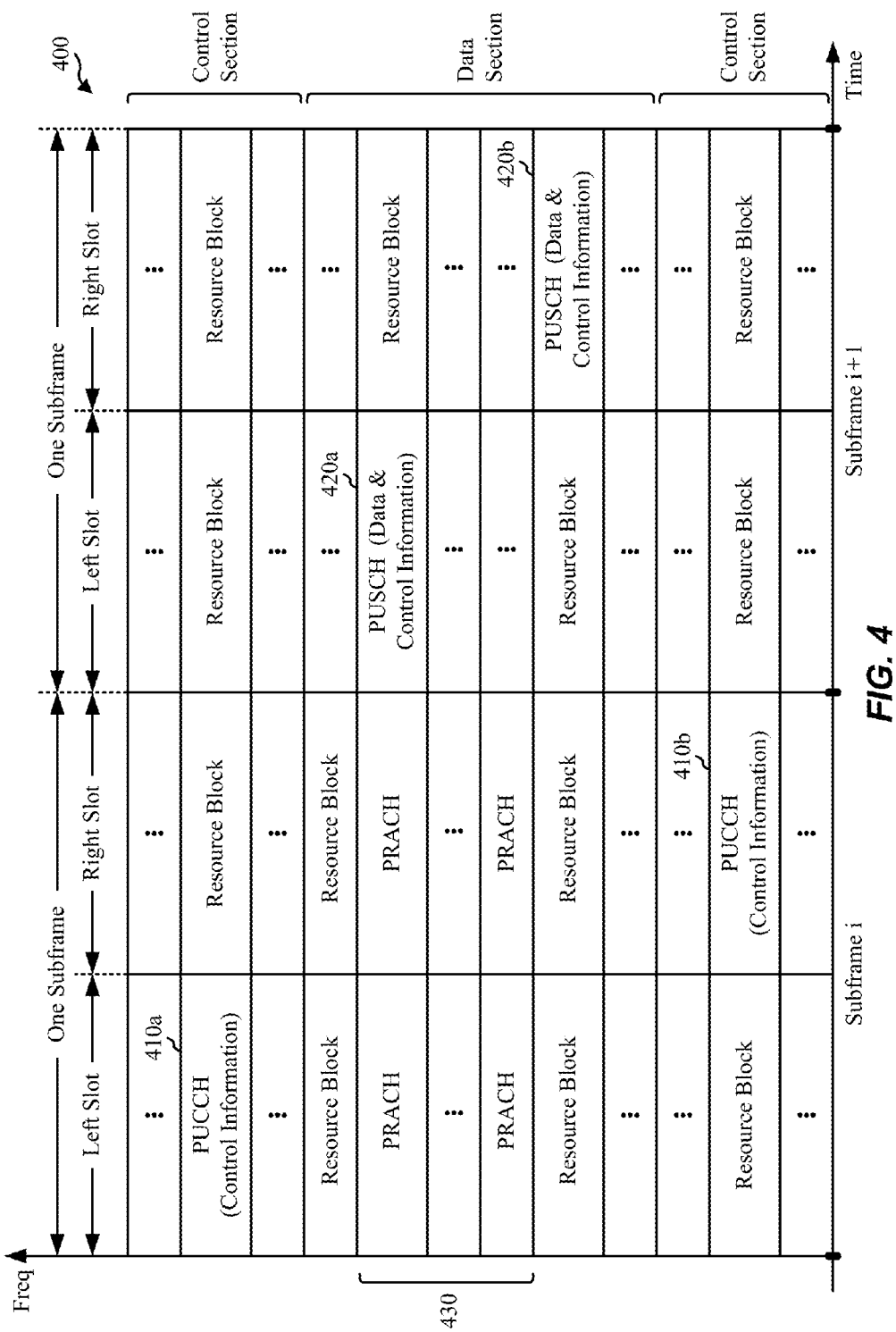
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
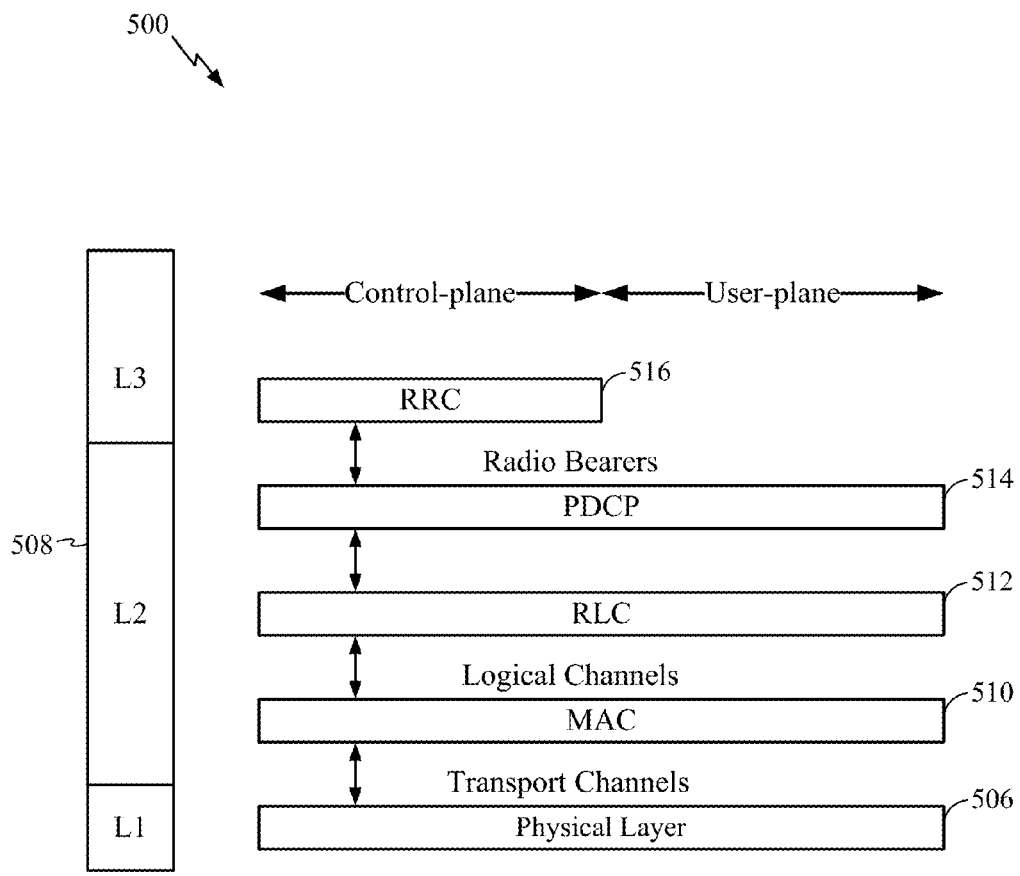
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
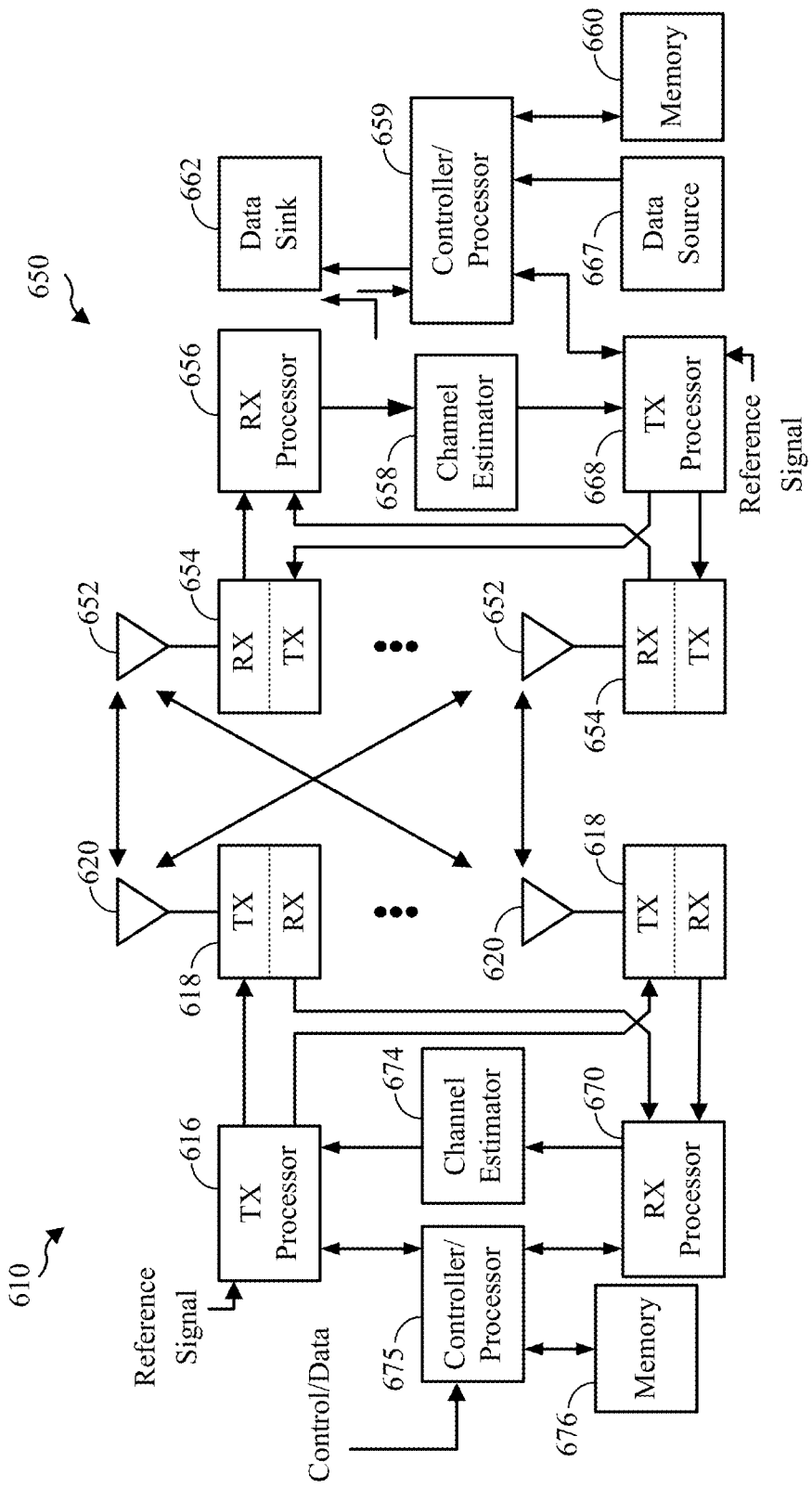
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Narrow Bandwidth Operation in LTE

One aspect of the present disclosure pertains to narrow bandwidth operation within a wider LTE system bandwidth. In particular, this includes configuring the network in a way to support a class of UEs that is only capable of narrow bandwidth transmission and reception with the goal to enable low cost implementations. These narrow bandwidth UEs may coexist with other full bandwidth LTE UEs within the same frequency band, without creating legacy issues other than the system bandwidth being shared among the two types of UEs: regular and narrow bandwidth UEs. One aspect provides a low cost terminal configured to operate within, for example, the Release 8, 9 and/or 10 specifications as already defined. It will be appreciated that the terms narrow bandwidth UE, narrow band UE and low cost LTE are used interchangeably. It will also be appreciate that a "regular" UE refers to a UE that operates in the full bandwidth range, or wider bandwidth range than the narrow bandwidth UE.

One aspect of the present disclosure is directed to random access channel (RACH) design considerations for the narrow bandwidth operation of low cost LTE devices, and includes both contention based procedures as well as non-contention based procedures. In contention based procedures, multiple UEs may access the eNodeB simultaneously, and when a UE attempts to access the eNodeB, the eNodeB does not know the identity of the particular UE. The eNodeB resolves which UEs are accessing it by using contention resolution.

In non-contention based procedures, the UE uses assigned RACH resources to access the eNodeB. The use of assigned RACH resources by the UE indicates to the eNodeB which UE is accessing it. In one aspect, only contention based procedures are supported for a low cost UE.

FIGS. 7A & 7B illustrate examples of narrow bandwidth operation. In particular, FIG. 7A illustrates a narrowband operation where the SIB and paging information are carried in the same center 6 resource blocks (6). Optionally, the SIB and paging information may be carried in narrow region other than the center, as illustrated in FIG. 7B.

Figure 8:
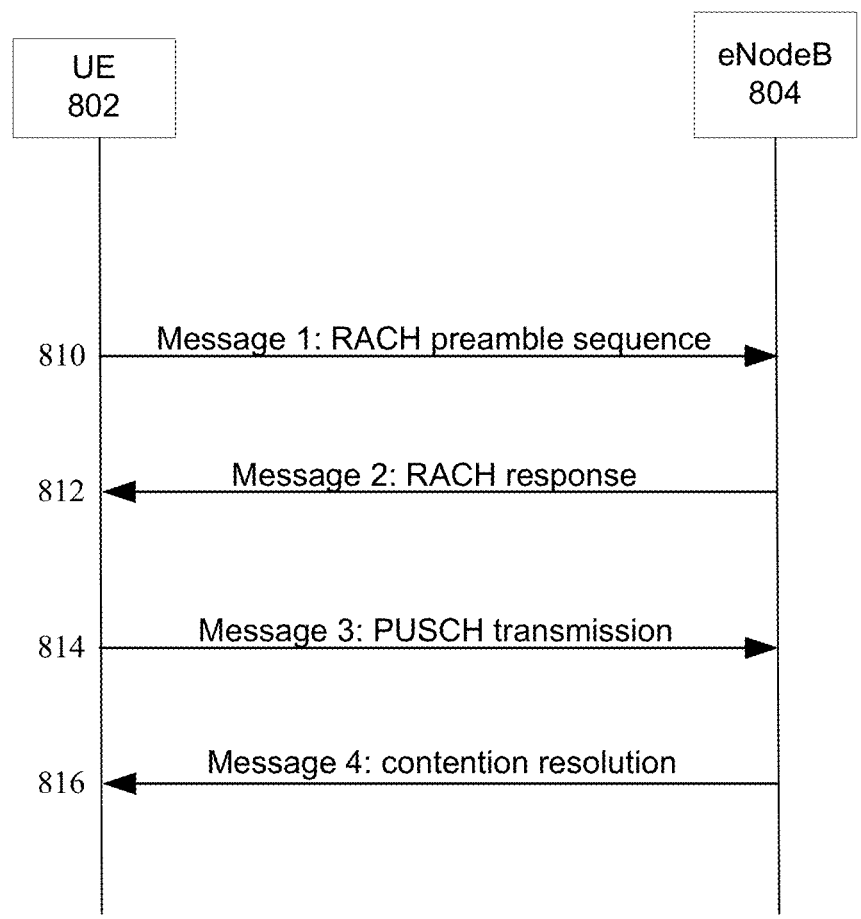
FIG. 8 is a call flow diagram illustrating a contention based RACH procedure between a UE and eNodeB.

Referring to FIG. 8, a call flow diagram illustrates a contention based RACH procedure between a UE 802 and eNodeB 804. The contention based RACH procedure may include four messages. At time 810, the UE 802 transmits Message 1, which is an uplink transmission that includes the RACH preamble sequence transmission. At time 812, the UE 802 receives Message 2 from the eNodeB 804. Message 2 is a downlink transmission that includes the RACH response on the physical downlink shared channel (PDSCH). The UE 802 transmits Message 3 at time 814. Message 3 is a physical uplink shared (PUSCH) transmission. Message 4 is transmitted at time 816 by the eNodeB 804 and is the second downlink transmission. Message 4 is used for contention resolution on the PDSCH.

In one aspect, Messages 1 and 3 may be transmitted in a center resource block region as illustrated in FIG. 7A. Alternately, in another aspect, the Messages 1 and 3 may be transmitted in a narrow band region other than the center resource blocks, as illustrated in FIG. 7B.

For Message 1, the initial access may be based on the physical random access channel (PRACH), which spans six resource blocks (RBs). The location in time and frequency of the PRACH is set by higher layers (e.g., set in frequency at the edge of the uplink transmission bandwidth to avoid fragmentation of data transmissions). For narrow bandwidth operation, the location of PRACH opportunities may be identified via the detection of system information blocks (SIBs).

In one aspect for operating a narrow bandwidth UE in a wider bandwidth system, the eNodeB broadcasts two sets of RACH configurations: one for regular UEs and one for narrow bandwidth UEs (i.e., those UEs operating in a narrow bandwidth mode). The narrow bandwidth UEs monitor a narrow bandwidth control channel assignment for message 2, while the regular UEs are able to monitor the PDCCH which spans the whole bandwidth.

The different configurations for narrow bandwidth UEs may include different PRACH configuration indices, PRACH root sequences, frequency positions or different radio access radio network temporary identifiers (RA_RNTI) such as NB_RA_RNTI (narrow bandwidth RA_RNTI).

In particular, when the UE transmits Message 1, at time 810, the eNodeB can then identify the UE as a narrow bandwidth UE or a regular UE, and can configure Message 2 accordingly. The RACH frequency can be restricted in the center six resource blocks, or optionally in other frequency locations. If other frequency location are supported, flexible duplexing separation between the downlink and uplink central frequencies may be implemented to allow the six resource blocks for downlink (PSS/SSS/PBCH/SIB/Paging) and the six resource blocks for uplink transmission (of PRACH) to be at multiple places.

In another aspect, only a subset of the RACH format is supported. For example, in one configuration, only format 0 for FDD or format 4 for TDD is supported. Optionally, in another configuration, only RACH formats with long duration (e.g., format 3) for coverage extension and transmit power reduction are supported. Additionally, another configuration may define a new format (e.g., a four resource block RACH), having a smaller RACH bandwidth that does not occupy the entire band for the 1.25 MHz operation. In the smaller RACH bandwidth configuration the other two resource blocks (RBs) may be used for PUCCH. The configurations may provide sufficient amounts of bandwidth for timing resolution.

The frequency band selection for Messages 1-4 may also depend on the initial acquisition and system information block (SIB) transmissions, because the Message 1 configuration comes from SIB2. In particular, in one configuration option, all of the UEs, including narrow bandwidth operation UEs, rely on the same PSS/SSS/PBCH for cell acquisition. Optionally, in another configuration, the master information block (MIB) can be specially designed for machine type communication (MTC devices, which are different from the MIB for regular UEs. Currently, the RACH configuration is carried on SIB2 along with other radio resource control (RRC) configurations. SIB1 is transmitted with a fixed schedule having a periodicity of 80 milliseconds (ms) and repetitions within 80 ms. The first transmission is scheduled in subframe #5 with SFNmod8=0. Repetition is scheduled in subframe #5 for all radio frames where SFNmod2=0. SIB2 is mapped to the system information (SI) message and corresponds to the first entry in the list of system information messages in "schedulingInfoList" in SIB1. Further, SIB2 is dynamically scheduled within the system information time window. SIB2 can be scheduled at any subframe except for multimedia broadcast over a single frequency network (MB-SFN) subframes, uplink subframes in TDD, and subframes where SIB1 is transmitted. The UE monitors PDCCH with a system information radio network temporary identifier (SI-RNTI) for the detailed scheduling information.

For narrow bandwidth operations, the UE does not monitor PDCCH or PDSCH with large bandwidth. Accordingly, both SIB1 and SIB2 transmissions may be modified to support such operations. In particular, SIB signaling may be modified by using the enhanced physical data channel (ePDCCH) to signal the SIB transmissions. The ePDCCH is a narrowband control channel similar to the relay physical downlink control channel (R-PDCCH). The ePDCCH can be carried within the center six resource blocks, so the UE can acquire PSS/SSS/PBCH and SIB1 scheduling information all from the same center six resource blocks. Cross subframe scheduling may be used if the narrow bandwidth UE tunes from the center six resource blocks to another band for SIB reception.

Optionally, in an alternate configuration, fixed frequency and/or modulation and coding scheme (MCS) assignments may be used for SIB1, thus obviating the need for PDCCH detection from the low cost UE.

SIB transmissions may also be modified to support narrow bandwidth operation. In particular, simplified SIB/paging signaling may be implemented for narrow bandwidth operations. The relevant SIB and paging signals may be carried on the same center six resource blocks, or on another narrow band. Optionally, in an alternate configuration, the regular SIB1/SIB2 transmissions may be restricted to a narrow bandwidth. Then the EPDCCH can be mapped to the same SIBs as regular UEs. The UE may retune from center frequency to SIB frequency to decode SIB. Cross subframe scheduling may be used for retuning. If the RACH occurs outside the center frequency, the alternate frequency is signaled to the UE.

Various designs may be configured for Message 2. Detection of PDCCH with RA-RNTI or NB-RA-RNTI may be attempted during a window controlled by a higher layer. For narrow bandwidth UEs, the eNodeB sends the RACH response from a narrow bandwidth. In one configuration, Message 2 is transmitted, at time 812, from the same narrow bandwidth where SIB/paging signals are transmitted. Optionally, in another configuration, to avoid congestion in the center six resource blocks, other narrow band locations (locations other than the center six resource blocks) are designated for Message 2. These resource blocks may be linked to the Message 1 configurations so that different RACH groups are equally distributed in frequency. The linking occurs either via signaling or is pre-specified.

Because the UE only monitors the narrow bandwidth, e.g., 6 RBs, the downlink assignments are restricted to the narrow band. In one configuration, ePDCCH is used for the downlink assignment. To send Message 2, the ePDCCH and RACH responses may be combined into one transmission. For example, the RACH response may be transmitted on the fixed bandwidth with a fixed MCS using the ePDCCH. Alternatively, the UE may blind decode the RACH response instead of decoding ePDCCH. Additionally, the transmission may be based on tail biting convolutional code (TBCC) coding. Further, in another configuration, the content of Message 2 may be reduced to take into account narrow bandwidth operation. For example, the 20 bit random access response (RAR) grant can be reduced if only small subsets of narrow bandwidth are signaled.

Various design configurations may be implemented for Message 3. The transmission of Message 3, at time 814, is scheduled in Message 2 by the 20 bit random access response (RAR) grant. The uplink transmission may be located in the same center six resource blocks where Message 1 is sent. This may be designed in conjunction with the cell acquisition and SIB design, where PSS/SSS/PBCH/SIB/Paging can be also fixed in the middle of the downlink carrier, such that low cost device starts with the fixed frequency bands for both acquisition and RACH.

Optionally, the eNodeB may use the 20 bit grant to assign the UE to another narrow bandwidth for Message 3 and beyond. This allows for scheduling flexibility. Once contention resolution is completed, the UE continues to use this uplink bandwidth for transmission to avoid unnecessary frequency transitions. If the contention resolution is not successful, then the UE returns to the center frequency band for Message 1 transmission(s). Further, linking Message 3 to Message 1 groups may equally spread narrow bandwidth UEs across different bandwidth.

In one aspect, the regular transmission of Message 3 supports HARQ retransmission. Thus, the UE monitors PHICH, although alternative designs can be implemented to avoid PHICH detection. For example, a PHICH-less operation may be implemented where the UE monitors ePDCCH for its Message 3 transmission. A new grant for retransmission may be interpreted as an ACK/NAK. Optionally, another configuration uses HARQ-less operation where the UE does not support retransmission. The UE will begin the RACH procedure again if the prior RACH operation was unsuccessful. In one aspect, power ramping may increase the RACH detection probability if it is unsuccessful the first time.

Various design configurations may be implemented for Message 4. After contention resolution in Message 4, the eNodeB can potentially assign narrow bandwidth UEs to different downlink/uplink resources for further communications. For example, in one design configuration, new fields may be standardized to signal narrow bandwidth UEs in Message 4 for its default downlink and uplink transmission bands. Therefore, the UE knows where to look for its transmission. Optionally, in an alternate configuration, ePDCCH may be used for assignments and/or fixed allocations (similar to Message 2). This configuration relies on UE blind decoding.

In Message 4, the eNodeB can provide the uplink assignment in order to avoid the scheduling request transmission from the UE for the radio resource control (RRC) connection setup request.

Another aspect considers non-contention based access. The non-contention based access procedure is used for handover and the arrival of downlink data during the RRC_CONNECTED state when the uplink is not synchronized.

Figure 9:
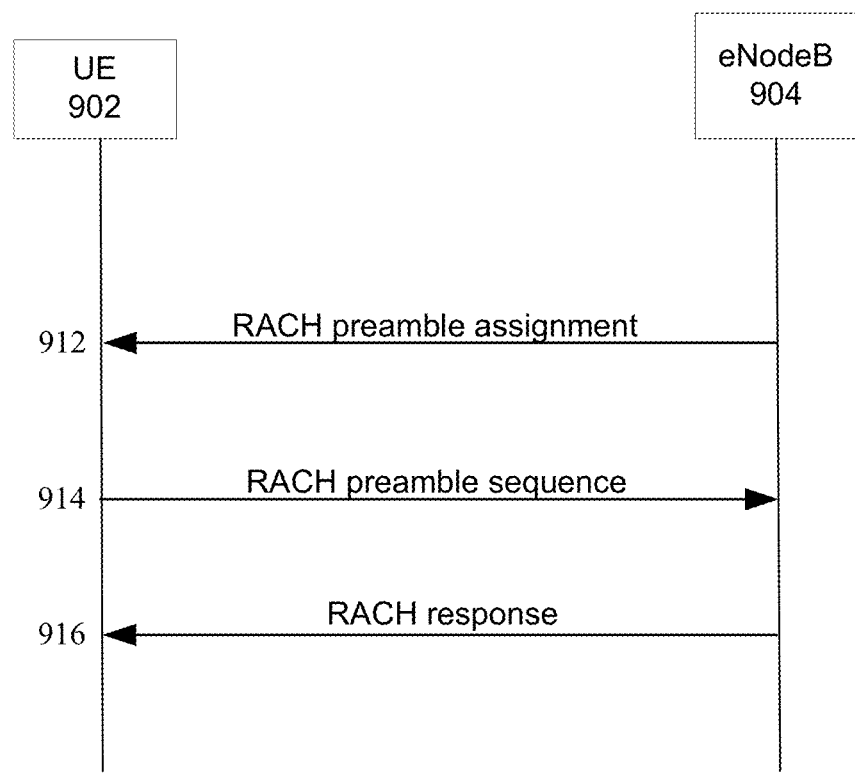
FIG. 9 is a call flow diagram illustrating a non-contention based RACH procedure between a UE and eNodeB.

The steps for a non-contention based access procedure is illustrated in the call flow diagram of FIG. 9. At time 912, the eNodeB 904 transmits a downlink transmission that includes the RACH preamble assignment through dedicated signaling. At time 914, the UE 902 sends an uplink transmission that includes the RACH preamble. At time 916, the eNodeB 904 sends a RACH response in PDSCH.

When the UE is in the RRC_CONNECTED state and the uplink is not synchronized, then at time 912, the eNodeB 904 can send the preamble assignment through the same downlink transmission for the narrow bandwidth operation, (e.g., use the current downlink narrow bandwidth for the assignment). At time 914, the RACH preamble transmission can then be scheduled at the same uplink narrow bandwidth as the last uplink transmission from the UE 902 or can match the downlink narrow bandwidth transmission. At time 916, the RACH response is transmitted in the same downlink narrow bandwidth as step 1 (or time 912). Within this message, the eNodeB can signal the UE for new downlink and uplink narrow bandwidth transmission/reception. This may be done by specifying new fields in the RACH response for the default downlink and uplink transmission resource blocks (e.g., six resource blocks for uplink and six resource blocks for downlink).

Various design configurations may be implemented for RACH after handover. For example, non-contention based access may be eliminated and the process may instead rely on only contention based RACH. Optionally, in another configuration, if non-contention based RACH is supported, then the same six resource blocks may be used as the PSS/SSS/PBCH. Additionally, usage of other narrow bands may only occur after the RACH procedure.

The transmission power for RACH and Message 3 are currently defined for the cell as a common parameter for all users (e.g., preambleInitialReceivedTargetPower). For narrow bandwidth UEs, a different offset in power based on the UE coverage and transmit power requirement may be configured.

The timer for the RACH procedure is currently defined as a common parameter for all users in a cell (e.g., RA-ResponseWindowSize, mac-ContentionResolutionTimer). In one configuration, narrow bandwidth UEs may have a different offset in the timer because low cost devices are expected to have low mobility and typically have delay tolerant applications.

For Message 3, there is currently one common configuration for maximum retransmission (maxHARQ-Msg3Tx). A larger number of retransmissions may be defined for narrow bandwidth UEs.

Direct current (DC) offset considerations may impact the configurations of the narrow bandwidth UEs. The PRACH reception at the eNodeB from narrow bandwidth UE transmissions may occur at different places depending on the center frequency local oscillator (LO) frequency of the transmitting narrow bandwidth UE. A direct current compensation loop may be provided to account for direct current offset. That is, the DC compensation loop can account for the location of the center frequency. For downlink reception (PDSCH/ePDCCH) at the UE, the middle resource elements at the centered frequency may be notched out.

Frequency retuning considerations may also impact the configuration of the narrow bandwidth UEs. Currently, 300 micro seconds (us) of switch time are utilized. To reduce this time, one configuration provides two local oscillator (LO) frequencies (e.g., one for the current center frequency and the other for the upcoming center frequency).

Figures 10A, 10B:
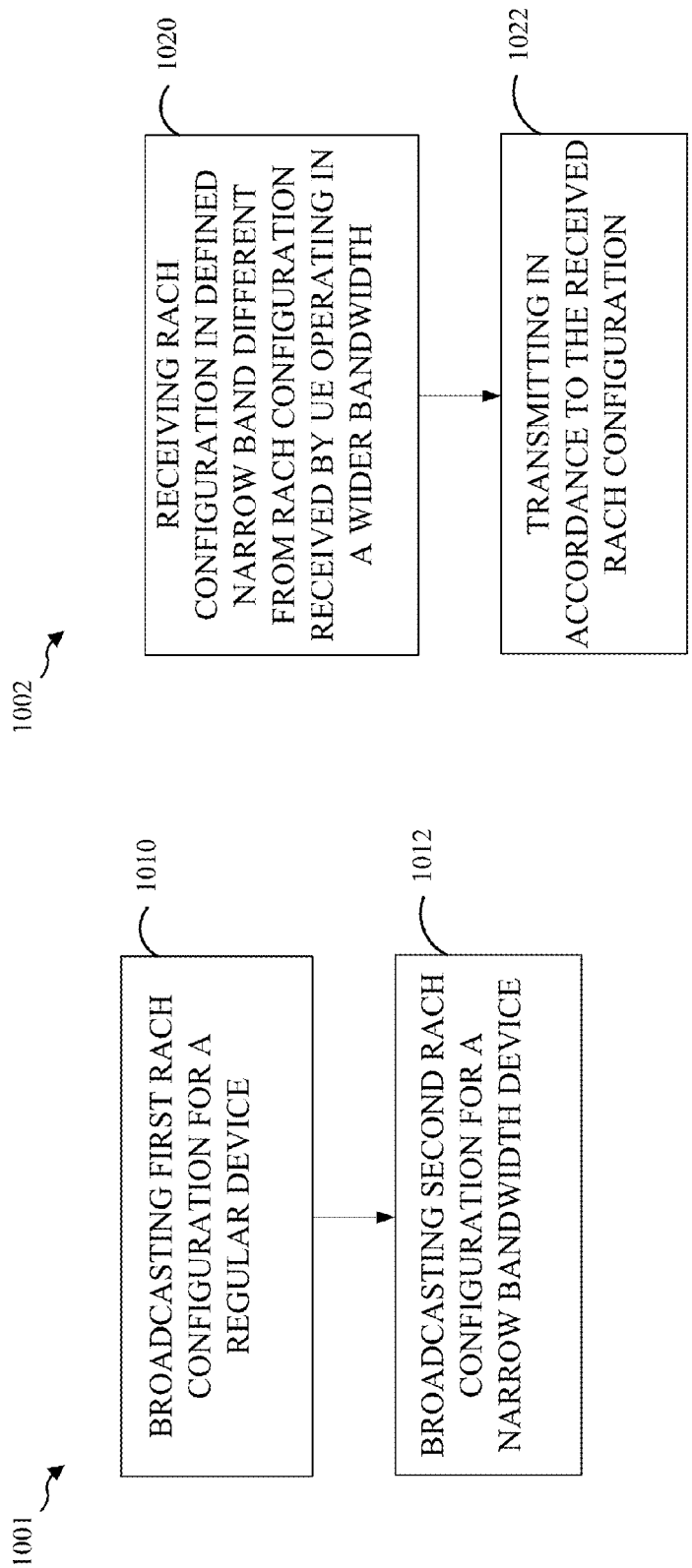
FIGS. 10A and 10B are block diagrams illustrating methods of operating in a narrow bandwidth in a system having an overall wider bandwidth.

FIGS. 10A and 10B illustrate methods of narrow bandwidth operation in a system having a wider bandwidth. In particular, FIG. 10A illustrates a method 1001 for configuring RACH in a narrow bandwidth UE. In block 1010, the eNodeB broadcasts a first RACH configuration for a regular device, such as a UE operating in the same spectrum of bandwidth as the base station. In block 1012, the eNodeB broadcasts a second RACH configuration for a narrow bandwidth device. The narrow bandwidth device operates in a bandwidth narrower than the regular device.

FIG. 10B illustrates a method 1002 for a narrow bandwidth device to operate in a system including a wider bandwidth. In block 1020, the UE receives a RACH configuration in a defined narrow band different from a RACH configuration received by a regular UE. In block 1022, the UE transmits in accordance with the received RACH configuration.

In one configuration, the eNodeB 610 is configured for wireless communication including means for broadcasting a first RACH configuration, and also means for broadcasting a second RACH configuration. In one aspect, the broadcasting means may be the transmit (TX) processor 616, transmitters 618, antenna 620, controller processor 675 and/or memory 676 configured to perform the functions recited by the broadcasting means. In another aspect, the aforementioned means may be any module or any apparatus configured to perform the functions recited by the aforementioned means.

In one configuration, the UE 650 is configured for wireless communication including means for receiving. In one aspect, the receiving means may be the antenna 652, receivers (RX) 654, receiver processor 656, controller/processor 659 and/or memory 660 configured to perform the functions recited by the receiving means. The UE 650 is also configured to include means for transmitting. In one aspect, the transmitting means may be the controller/processor 659, memory 660, transmit (TX) processor 668, transmitters 654 and/or antenna 652 configured to perform the functions recited by the transmitting means. In another aspect, the aforementioned means may be any module or any apparatus configured to perform the functions recited by the aforementioned means.

Figure 11A:
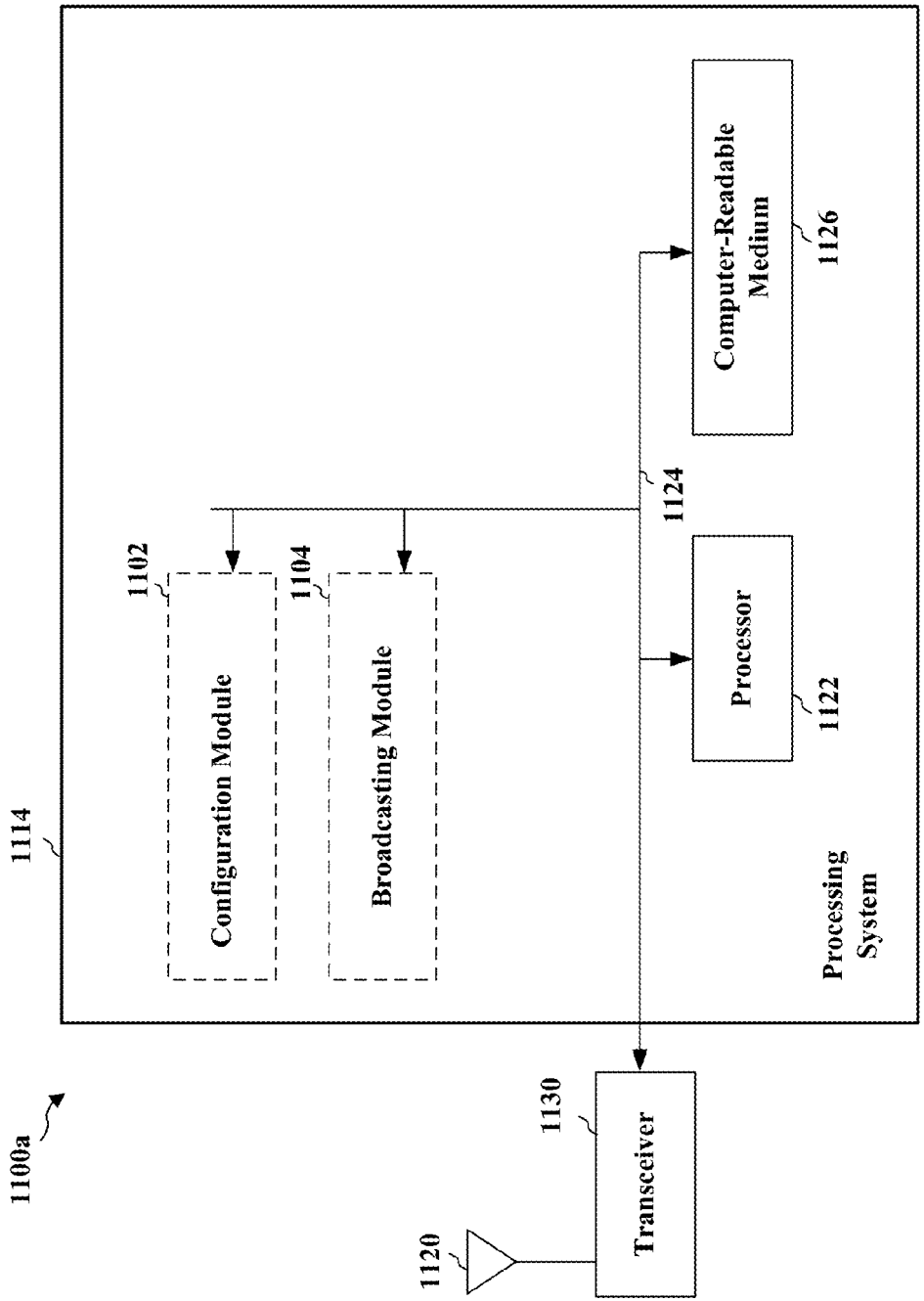
FIGS. 11A and 11B are block diagram illustrating different modules/means/components in an exemplary apparatus.
Figure 11B:
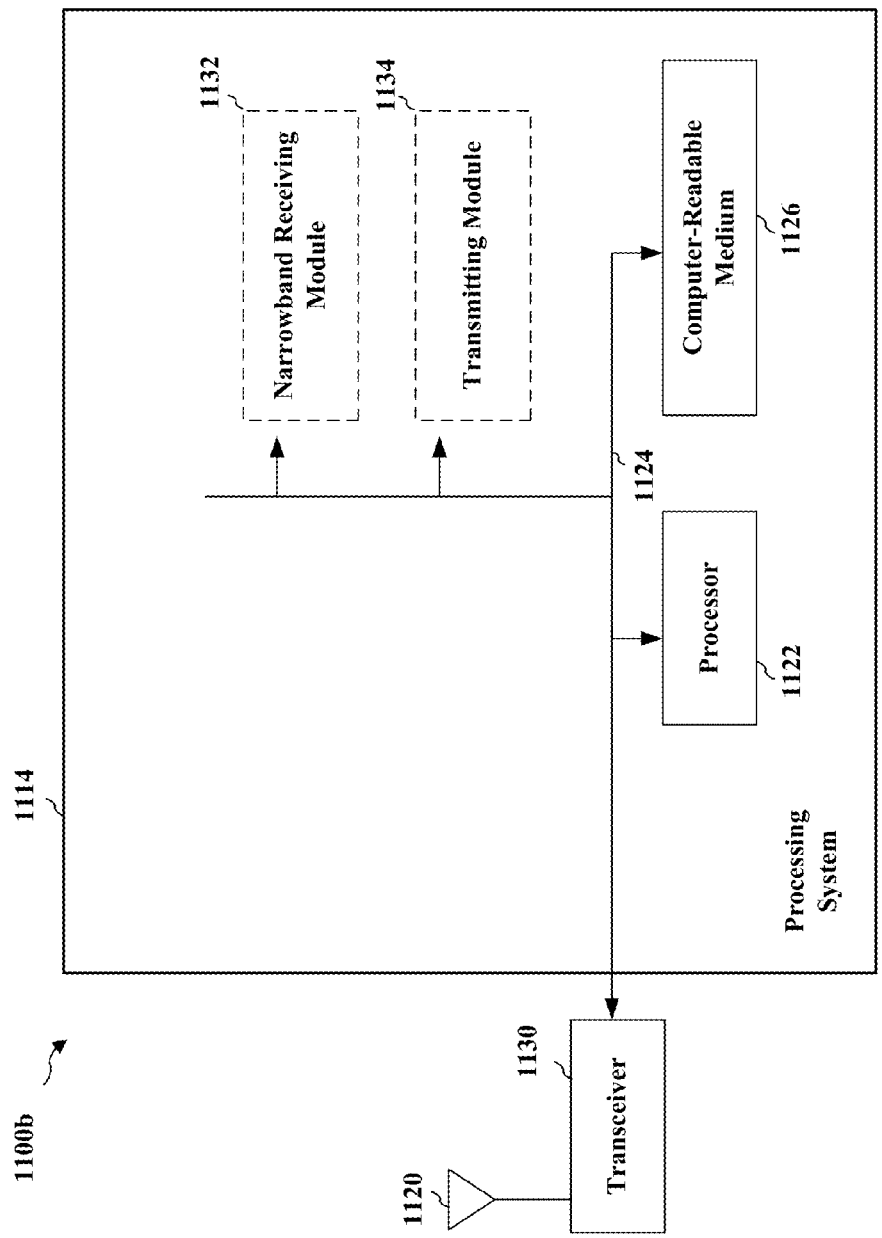

FIGS. 11A and 11B are diagram illustrating an example of a hardware implementation for an apparatus 1100a, 1100b employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122 the modules 1102, 804 and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

FIG. 11A illustrates an apparatus 1100a for use as a component of an eNode B. The processing system 1114 includes a configuration module 1102 and a broadcasting module 110 linked to the bus 1124. The configuration module 1102 configures a RACH configuration for a regular device as and a RACH configuration for a narrowband device operating in a narrower bandwidth than the regular device. The processing system 1114 also includes a broadcasting module 1104 for broadcasting the different RACH configurations. The modules may be software modules running in the processor 1122, resident/stored in the computer-readable medium 1126, one or more hardware modules coupled to the processor 1122, or some combination thereof. The processing system 1114 may be a component of the eNodeB 610 and may include the memory 676, the controller/processor 675 and/or the transmit processor 616.

FIG. 11B illustrates an apparatus 1100b for use as a component of a user equipment (UE). The processing system 1114 includes a narrowband receiving module 1132 and a transmitting module 1134 linked to the bus 1124. The narrowband receiving module 1132 receives a random access channel (RACH) configuration in a defined narrow bandwidth different from a RACH configuration received by a regular user equipment. The transmitting module 1134 transmits in accordance with the received RACH configuration. The modules may be software modules running in the processor 1122, resident/stored in the computer-readable medium 1126, one or more hardware modules coupled to the processor 1122, or some combination thereof. The processing system 1114 may be a component of the eNodeB 610 and may include the memory 676, the controller/processor 675 and/or the transmit processor 616.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a narrow bandwidth device of a wider bandwidth system, comprising:
    broadcasting, from a base station, a first random access channel (RACH) configuration for a wide bandwidth device;
    broadcasting, from the base station, a second RACH configuration for the narrow bandwidth device, wherein the narrow bandwidth device operates in a narrower bandwidth than the wide bandwidth device;
    receiving, at the base station, a RACH sequence in accordance with the first RACH configuration or the second RACH configuration; and
    transmitting, via a downlink shared channel, a RACH response in response to the received RACH sequence, at least a frequency specified for transmitting the RACH response being configured based at least in part on whether the RACH sequence was received in accordance with the first RACH configuration or the second RACH configuration, the RACH response being transmitted within the narrower bandwidth when the RACH sequence is received with the second RACH configuration, and the RACH response being signaled by a narrowband physical downlink control channel in the narrower bandwidth.

2. The method of claim 1, in which the narrow bandwidth device is a user equipment (UE).

3. The method of claim 1, in which the second RACH configuration includes physical random access channel (PRACH) configuration indices, PRACH root sequences, frequency positions and/or radio network temporary identifier (RNTI).

4. The method of claim 1, further comprising transmitting a message to assign the narrow bandwidth device to a different narrow bandwidth.

5. The method of claim 1, further comprising assigning different uplink and downlink resources to the narrow bandwidth device.

6. The method of claim 1, further comprising transmitting a response to the narrow bandwidth device, the response indicating a new downlink narrow bandwidth.

7. The method of claim 1, further comprising assigning a transmit power, timer offset, and/or number of retransmissions to the narrow bandwidth device that is different from a wide bandwidth device assignment.

8. A method of wireless communication by a narrow bandwidth device, operating in a system including a wider bandwidth, comprising:
    receiving, at the narrow bandwidth device from a base station, a second random access channel (RACH) configuration in a defined narrow band that is different from a first RACH configuration which is receivable by a wide bandwidth user equipment (UE);
    transmitting, to the base station, a RACH sequence in accordance with the received second RACH configuration; and
    receiving, at the narrow bandwidth device from the base station, a RACH response in response to the transmitted RACH sequence, at least a frequency specified for the received RACH response being configured based at least in part on whether the RACH sequence was transmitted in accordance with the first RACH configuration or the second RACH configuration, the RACH response being received within the narrower bandwidth when the RACH sequence is transmitted with the second RACH configuration, and the RACH response being signaled by a narrowband physical downlink control channel in the narrower bandwidth.

9. The method of claim 8, in which the narrow bandwidth device is a UE.

10. The method of claim 8, further comprising receiving a message to assign the narrow bandwidth device to operate in a different narrow bandwidth.

11. The method of claim 8, further comprising receiving a message assigning a transmit power, timer offset, and/or number of retransmissions to the narrow bandwidth device that is different from a wide bandwidth device assignment.

12. A base station configured for wireless communication, comprising:
    a memory; and
    at least one processor coupled to the memory, the at least one processor being configured:
        to broadcast a first random access channel (RACH) configuration for a wide bandwidth device;
        to broadcast a second RACH configuration for a narrow bandwidth device, wherein the narrow bandwidth device operates in a narrower bandwidth than the wide bandwidth device;
        to receive a RACH sequence in accordance with the first RACH configuration or the second RACH configuration; and
        to transmit, via a downlink shared channel, a RACH response in response to the received RACH sequence, at least a frequency specified for transmitting the RACH response being that is configured based at least in part on whether the RACH sequence was received in accordance with the first RACH configuration or the second RACH configuration, the RACH response being transmitted within the narrower bandwidth when the RACH sequence is received with the second RACH configuration, and the RACH response being signaled by a narrowband physical downlink control channel in the narrower bandwidth.

13. The base station of claim 12, in which the narrow bandwidth device is a user equipment (UE).

14. The base station of claim 12, in which the second RACH configuration includes physical random access channel (PRACH) configuration indices, PRACH root sequences, frequency positions and/or radio network temporary identifier (RNTI).

15. The base station of claim 12, in which the at least one processor is further configured to transmit a message to assign the narrow bandwidth device to a different narrow bandwidth.

16. The base station of claim 12, in which the at least one processor is further configured to assign different uplink and downlink resources to the narrow bandwidth device.

17. The base station of claim 12, in which the at least one processor is further configured to transmit a response to the narrow bandwidth device, the response indicating a new downlink narrow bandwidth.

18. The base station of claim 12, in which the at least one processor is further configured to assign a transmit power, timer offset, and/or number of retransmissions to the narrow bandwidth device that is different from a wide bandwidth device assignment.

19. A narrow bandwidth device configured for wireless communication, comprising:
 a memory; and
 at least one processor coupled to the memory, the at least one processor being configured:
  to receive, from a base station, a second random access channel (RACH) configuration in a defined narrow band that is different from a first RACH configuration which is receivable by a wide bandwidth user equipment (UE);
  to transmit, to the base station, a RACH sequence in accordance with the received second RACH configuration; and
  to receive, from the base station, a RACH response in response to the transmitted RACH sequence, at least a frequency specified for the received RACH response being configured based at least in part on whether the RACH sequence was transmitted in accordance with the first RACH configuration or the second RACH configuration, the RACH response being received within a narrower bandwidth when the RACH sequence is transmitted with the second RACH configuration, and the RACH response being signaled by a narrowband physical downlink control channel in the narrower bandwidth.

20. The narrow bandwidth device of claim 19, in which the narrow bandwidth device is a UE.

21. The narrow bandwidth device of claim 19, in which the processor is further configured to receive a message to assign the narrow bandwidth device to operate in a different narrow bandwidth.

22. The narrow bandwidth device of claim 19, in which the processor is further configured to receive a message assigning a transmit power, timer offset, and/or number of retransmissions to the narrow bandwidth device that is different from a wide bandwidth device assignment.

23. An apparatus for wireless communication, comprising:
 means for broadcasting, from a base station, a first random access channel (RACH) configuration for a wide bandwidth device;
 means for broadcasting, from the base station, a second RACH configuration for a narrow bandwidth device, wherein the narrow bandwidth device operates in a narrower bandwidth than the wide bandwidth device;
 means for receiving, at the base station, a RACH sequence in accordance with the first RACH configuration or the second RACH configuration; and
 means for transmitting, via a downlink shared channel, a RACH response in response to the received RACH sequence, at least a frequency specified for transmitting the RACH response being that is configured based at least in part on whether the RACH sequence was received in accordance with the first RACH configuration or the second RACH configuration, the RACH response being transmitted within the narrower bandwidth when the RACH sequence is received with the second RACH configuration, and the RACH response being signaled by a narrowband physical downlink control channel in the narrower bandwidth.

24. An apparatus for wireless communication, comprising:
 means for receiving, at a narrow bandwidth device from a base station, a second random access channel (RACH) configuration in a defined narrow band that is different from a first RACH configuration received by a wide bandwidth user equipment (UE);
 means for transmitting, to the base station, a RACH sequence in accordance with the received second RACH configuration; and
 means for receiving, at the narrow bandwidth device from the base station, a RACH response in response to the transmitted RACH sequence, at least a frequency specified for the received RACH response being configured based at least in part on whether the RACH sequence was transmitted in accordance with the first RACH configuration or the second RACH configuration, the RACH response being received within a narrower bandwidth when the RACH sequence is transmitted with the second RACH configuration, and the RACH response being signaled by a narrowband physical downlink control channel in the narrower bandwidth.

25. A non-transitory computer-readable medium having non-transitory program code recorded thereon, the program code comprising:
 program code to broadcast, from a base station, a first random access channel (RACH) configuration for a wide bandwidth device;
 program code to broadcast, from the base station, a second RACH configuration for a narrow bandwidth device, wherein the narrow bandwidth device operates in a narrower bandwidth than the wide bandwidth device;
 program code to receive, at the base station, a RACH sequence in accordance with the first RACH configuration or the second RACH configuration; and
 program code to transmit, via a downlink shared channel, a RACH response in response to the received RACH sequence, at least a frequency specified for transmitting the RACH response being that is configured based at least in part on whether the RACH sequence was received in accordance with the first RACH configuration or the second RACH configuration, the RACH response being transmitted within the narrower bandwidth when the RACH sequence is received with the second RACH configuration, and the RACH response being signaled by a narrowband physical downlink control channel in the narrower bandwidth.

26. A non-transitory computer-readable medium having non-transitory program code recorded thereon, the program code comprising:

program code to receive, at a narrow bandwidth device from a base station, a second random access channel (RACH) configuration in a defined narrow band that is different from a first RACH configuration which is receivable by a wide bandwidth user equipment (UE);

program code to transmit, to the base station, a RACH sequence in accordance with the received second RACH configuration; and program code to receive, at the narrow bandwidth device from the base station, a RACH response in response to the transmitted RACH sequence, at least a frequency specified for the received RACH response being configured based at least in part on whether the RACH sequence was transmitted in accordance with the first RACH configuration or the second RACH configuration, the RACH response being received within a narrower bandwidth when the RACH sequence is transmitted with the second RACH configuration, and the RACH response being signaled by a narrowband physical downlink control channel in the narrower bandwidth.

* * * * *